United States Patent [19]

Sohda et al.

[11] Patent Number: 5,433,937
[45] Date of Patent: Jul. 18, 1995

[54] PROCESS FOR PRODUCING CARBON PREFORM

[75] Inventors: Yoshio Sohda, Machida; Yutaka Sonokawa, Yokohama; Takefumi Kohno, Kawasaki, all of Japan

[73] Assignee: Nippon Oil Company, Ltd., Tokyo, Japan

[21] Appl. No.: 163,064

[22] Filed: Dec. 6, 1993

[30] Foreign Application Priority Data

Dec. 4, 1992 [JP] Japan .................................. 4-356586

[51] Int. Cl.[6] .............................................. C01B 31/00
[52] U.S. Cl. ............................. 423/445 R; 423/447.4; 264/29.2
[58] Field of Search ..................... 423/445 R, 447.4; 264/29.3

[56] References Cited

U.S. PATENT DOCUMENTS

| | | | |
|---|---|---|---|
| 5,057,254 | 10/1991 | Sohda et al. | 264/29.2 |
| 5,071,700 | 12/1991 | Sugino et al. | 423/447.1 |
| 5,254,396 | 10/1993 | Takemura et al. | 423/447.4 |

Primary Examiner—Ferris Lander
Assistant Examiner—Stuart L. Hendrickson
Attorney, Agent, or Firm—Scully, Scott, Murphy & Presser

[57] ABSTRACT

A simple manufacturing process for obtaining a carbon/carbon composite of superior performance is provided without using a carbon fiber fabric which is expensive and without going through the step of fixing fibers together using a binder.

A precursor fiber for a carbon fiber which precursor fiber has been rendered infusible is subjected to uniaxial pressing at a temperature lower than the temperature adopted in the infusiblizing treatment, and then a carbonization treatment is performed.

According to the present invention, a primary-pressed carbon material can be produced without using a binder, thus resulting in that not only the carbon material but also a carbon/carbon composite can be produced in a simple manner.

14 Claims, No Drawings

PROCESS FOR PRODUCING CARBON PREFORM

BACKGROUND OF THE INVENTION

The present invention relates to a process for producing a carbon material.

Carbon/carbon composites are materials which retain high strength and high elastic modulus and exhibit a small coefficient of thermal expansion, even at temperatures higher than 1,000° C., thus having unique properties, and their application to parts of aeronautic and space machinery and appliances as well as brakes and furnace material is now expected.

The carbon fibers used in such carbon/carbon composites are mainly in the form of a two-dimensional fabric such as woven fabric, and in some particular use they are in the form of a three-dimensional fabric. Although the use of such fabrics affords carbon/carbon composites of a high strength, their structures and production methods for them are complicated and they are expensive.

On the other hand, in the case of using fibers such as so-called chopped strands, a satisfactory reinforcing effect cannot be obtained by a conventional method.

Further, in the case where there is performed a "densifying process" for producing a carbon/carbon composite from any of the above-mentioned fabrics and short carbon fibers, it is necessary to provide a separate step for fixing carbon fibers to one another using pitch or a thermosetting resin (binder), and this additional step is one of the causes of lowering the productivity in the carbon/carbon composite manufacturing process.

It is the object of the present invention to provide a simple manufacturing process capable of affording a carbon/carbon composite superior in performance without going through the fiber fixing step using a binder.

SUMMARY OF THE INVENTION

The present invention resides in a process of producing a carbon preform by uniaxially pressing a precursor fiber (hereinafter referred to as "infusibilized fiber") for carbon fiber which precursor fiber has been subjected to an infusibilizing treatment, at a temperature lower than the temperature adopted in the said infusibilizing treatment, and then subjecting the infusibilized fiber to a carbonizing treatment.

The present invention also resides in a process of producing a carbon preform by uniaxially pressing the infusibilized fiber at a temperature lower than the infusibilizing treatment temperature and then performing a carbonizing treatment under a uniaxial pressure lower than the pressure adopted in the said uniaxial pressing.

DETAILED DESCRIPTION OF THE INVENTION

The carbon fiber producing process according to the present invention will be described below in detail.

The "infusibilized fiber" as referred to herein indicates a fiber obtained by making pitch fiber infusible. In the case where the desired carbon material is required to have particularly high heat resistance and oxidation resistance, it is desirable to use an infusibilized fiber obtained by making pitch fiber infusible.

Using the infusibilized fiber is essential to the present invention. If a fiber has not been infusibilized, e.g. pitch fiber, is used, the constituent fibers will be melted in the uniaxial pressing step and the advantage as a fiber-reinforced material is lost, so it is impossible to obtain a carbon preform of good quality. On the other hand, if a carbonized fiber is used, the constituent fibers will not be bonded to each other to a satisfactory extent in the uniaxial pressing step, thus requiring the use of a binder, and hence it is impossible to attain the object of the present invention.

Among the materials employable for obtaining the infusibilized fiber in the invention, the most preferred one is a pitch fiber obtained by melt-spinning a carbonaceous pitch in a known manner and having an average diameter of 5 to 100 $\mu$m, preferably 7 to 30 $\mu$m.

The carbonaceous pitch is not specially limited and there may be used a known one. But particularly preferred is a coal-tar or petroleum based pitch having a softening point of 100° C. to 400° C., preferably 150° C. to 350° C. It is optional whether the carbonaceous pitch should be an optically isotropic pitch or an optically anisotropic pitch, but an optically anisotropic pitch having an optically anisotropic phase content of 60% to 100% is particularly preferred.

The infusibilizing treatment may be carried out by heating at a temperature of 50° C. to 400° C., preferably 100° C. to 350° C., more preferably 180° C. to 320° C., in an oxidizing gas atmosphere. As the oxidizing gas there may be used air, oxygen, a nitrogen oxide, a sulfur oxide, halogen, or a mixture thereof. The infusibilizing treatment is performed usually for 10 minutes to 20 hours, preferably 30 minutes to 10 hours.

In the present invention, the infusibilized fiber is uniaxially pressed at a temperature lower than the infusibilizing treatment temperature and then carbonized to obtain the carbon preform of the invention.

The uniaxial pressing is performed using a press machine at a pressure usually in the range of 1 to 100 kg/cm$^2$, preferably 2 to 50 kg/cm$^2$, more preferably not lower than 2 kg/cm$^2$ and lower than 20 kg/cm$^2$.

The temperature in the uniaxial pressing is lower than the infusibilizing treatment temperature and is usually in the range of 0° C. to 400° C., preferably 20° C. to 350° C. Even at room temperature the uniaxial pressing can be done to a satisfactory extent.

Usually the uniaxial pressing for the infusibilized fiber is conducted in a, non-oxidative atmosphere, but it can be performed even in the air to a satisfactory extent, whereby it is made possible to greatly simplify the press machine.

Preferably, for pressing the infusibilized fiber uniaxially, the same fiber is first dropped into a vessel for uniaxial pressing forcibly or freely and is stacked or naturally deposited therein.

For charging the infusibilized fiber in the form of continuous filament fibers into a vessel for uniaxial pressing, there may be adopted, for example, a method wherein the infusibilized fiber is dropped into the vessel through a container such as a basket or the like, a method wherein the infusibilized fiber is once fed onto a pulley and then into the vessel uniformly, or a method wherein the infusibilized fiber is charged into the vessel forcibly through an air ejector.

For charging the infusibilized fiber in the form of short fibers into a vessel for uniaxial pressing, there may be adopted, for example, a method wherein the same fiber in the form of short fibers is freely dropped into the vessel and deposited therein, or a method wherein the infusibilized fiber in the form of continuous filament fibers is fed to the position just above the vessel, then cut with a cutter or the like and dropped.

It is also possible to drop the pitch fiber in a mesh container during the spinning process, and to infusibilize the pitch fiber using the mesh container. The infusibilized fiber can be moved from the mesh container to a press die.

In all of the above fiber feeding methods, it is desirable that the fiber be fed uniformly, and for this purpose the fiber feeding apparatus and/or vessel may be moved so as to shift the fiber dropping position or received position. As the vessel for uniaxial pressing, the use of a die or the like for uniaxial pressing is preferred because of simplification of the process.

In these cases, fiber is stacked or deposited in the form of continuous filament fibers or short fibers 1 to 100 cm long.

Before or after carbonization and pressing under a uniaxial pressure, a needle punch treatment may be performed perpendicularly to the fiber stack plane direction.

According to the present invention, subsequent to the uniaxial pressing described above, a carbonizing treatment is conducted without uniaxial pressure or under a uniaxial pressure to obtain the carbon preform of the invention.

In the case where the carbonizing treatment is performed under the pressure adopted in the foregoing uniaxial pressing. More specifically, the carbonizing treatment under a uniaxial pressure is conducted at a pressure usually in the range of 0,001 to 100 kg/cm$^2$, preferably 0.01 to 50 kg/cm$^2$, more preferably higher than 0.02 kg/cm$^2$ and lower than 20 kg/cm$^2$, and lower than the pressure adopted in the foregoing uniaxial pressing, using a hot press.

The carbonizing treatment may be carried out while the uniaxially pressed fiber is placed in the vessel used in the forementioned uniaxial pressing. Alternatively, there may be adopted a method wherein the infusibilized fiber after uniaxial pressing is once taken out from the vessel, then sandwiched in between two plates and the plates are then fixed to each other with bolts.

The carbonizing treatment is performed at a temperature usually in the range of 400° C. to 3,000° C., preferably 500° C. to 2,500° C., for a period of time usually in the range of 10 minutes to 10 hours, preferably 30 minutes to 4 hours.

Further, the carbonizing treatment is preferably conducted in a non-oxidative atmosphere such as, for example, a nitrogen, helium, or argon atmosphere. If the same treatment is carried out at a relatively low temperature, for example, a temperature of 400° C. to 600° C. and for a short time, a non-oxidative atmosphere is not always required.

The void volume of the resulting preform is usually in the range of 10 to 90 vol %. If the void volume exceeds this range, the shape retaining property of the carbon preform will be deteriorated, and in the case of densifying the carbon material, there will occur chipping, cracking or deformation of the pressed product. On the other hand, if the void volume is smaller than the above range, the carbon preform will be cracked or undergo a brittle fracture, after the carbonization treatment, resulting in that the carbon preform exhibits such a material as that of a monolithic material, which is not desirable.

The bulk density of the carbon preform obtained; which depends on the carbonizing treatment temperature, is usually in the range of 0.1 to 1.8 g/cc, preferably 0.3 to 1.5 g/cc, more preferably 0.5 to 1.4 g/cc. If the bulk density is lower than the above range, the shape retaining property of the primary-molded product will be deteriorated, so in the case of densifying it, there will occur chipping or deformation thereof. On the other hand, if the bulk density exceeds the above range, the preform after densifying will undergo a brittle fracture and exhibit such a behavior as that of a monolithic material.

The carbonizing treatment described above may be followed by a carbonizing or graphitizing treatment at atmospheric pressure, which treatment may be carried out in a non-oxidative atmosphere usually at a temperature of 900° C. to 3,000° C., preferably 1,000° C. to 2,500° C.

Not only the carbon preform thus obtained is utilized as it is but also a carbon/carbon composite can be produced by densifying such carbon preform, which densifying is effected by forming a matrix by chemical vapor deposition and/or a matrix starting from pitch in void portions of the carbon preform.

As a method of densifying the carbon preform by chemical vapor deposition there may be adopted a method wherein a hydrocarbon such as, for example, methane, ethane, acetylene, propane, benzene or a natural gas, or at least one of them diluted with an inert gas or hydrogen, is subjected to a thermal decomposition, thereby allowing the thermally decomposed carbon to be deposited in the void portions of the carbon preform.

The temperature in the above chemical vapor positon is usually in the range of 700° C. to 3,000° C., preferably 800° C. to 2,500° C. The pressure in the chemical vapor deposition may be atmospheric pressure, but a reduced pressure is preferred, which is usually in the range of 0.5 to 100 Torr, preferably 0.5 to 50 Torr.

A diluent gas such as an inert gas or hydrogen may be used for the purpose of controlling the reaction rate. In this case, such diluent gas is used usually in an amount of 1 to 1,000 times, preferably 1 to 100 times, the volume of the above hydrocarbon gas. If the proportion of the diluent gas is smaller than this range, there will not be attained a satisfactory effect of dilution, and if it is larger than the above range, the reaction rate will be decreased to a greater extent than necessary. Thus, both such proportion are not desirable.

In the case where the carbon preform is densified by formation of a matrix starting from pitch, there usually is adopted a method wherein the carbon preform is impregnated with a carbonaceous pitch, followed by carbonization.

The carbonaceous pitch is not specially limited, but there may be used a known one. Particularly, it is desirable to use a coat- or petroleum-based pitch having a softening point in the range of 50° C. to 400° C., more preferably 150° C. to 300° C. Both optically isotropic pitch and anisotropic pitch are employable as carbonaceous pitches, but an optically anisotropic pitch having an optically anisotropic phase content of 60% to 100% is particularly preferred.

How to impregnate the carbonaceous pitch into the carbon preform is not specially limited, but a known method may be adopted. For example, there may be adopted a method wherein both carbon preform and carbonaceous pitch are sealed into a vacuum vessel and heat-melted under a reduced pressure, which pressure is, for example, $1 \times 10^{-2}$ to 300 Torr. The heating temperature is usually not lower than the softening point of the carbonaceous pitch used and lower than the decomposition start temperature thereof, preferably higher than the softening point by 30° C. or more and lower than the decomposition start temperature, more preferably 130° C. to 450° C.

The carbonization can be effected at atmospheric pressure, under pressure or under pressing.

The carbonization under pressure is carried out by making vacuous a vessel which contains the carbon preform impregnated with pitch, then applying pressure usually to a level in the range of 5 to 10,000 kg/cm$^2$, preferably 5 to 2,000 kg/cm$^2$, more preferably 9 to 90 kg/cm$^2$, using a non-oxidative gas such as, for example, argon, helium nitrogen as the case may be, preferably argon, and applying heat to a temperature of 400° C. to 2,000° C., preferably 500° C. to 1,500° C.

The carbonization under pressing is performed by applying pressure uniaxially to a level of usually 10 to 500 kg/cm$^2$, using a hot press, and heating to a temperature of usually 400° C. to 2,000° C., preferably 500° C. to 1,500° C.

According to the present invention, a primary-pressed carbon material can be produced without using a binder and therefore both carbon material and carbon/carbon composite can be manufactured in simple manner.

Moreover, the carbon preform thus obtained according to the present invention is in a pressed state wherein the constituent fibers fully retain their shape, and has a moderate void volume. Therefore, it is very useful as a starting material for the production of a carbon/carbon composite.

Such carbon preform can be obtained only by combining the uniaxial pressing of the infusibilized fiber at a low tempereature with carbonization. Even if any other material, e.g. pitch fiber or carbonized fiber is used, or even if pressing is conducted under any other conditions, or even if the order of steps is changed, if will be impossible to produce the carbon preform of the present invention.

[EXAMPLES]

The following examples are given to illustrate the present invention more concretely, but it is to be understood that the invention is not limited thereto.

Example 1

An optically anisotropic petroluem pitch having a softening point of 280° C. was melt-spun to afford pitch fibers having an average diameter of 13 μm. A tow of 2,000 filaments of the pitch fibers was made infusible in air at 230° C. for 2 hours to obtain a tow of infusibilized fibers. This tow was then placed in a die continuously from an upper portion of the die and was deposited therein, then pressed at 25° C. and at a uniaxial pressure of 50 kg/cm$^2$ for 2 minutes, using a press machine and thereafter carbonized in nitrogen gas at 1,000° C. and at atmospheric pressure for 1 hour to give a carbon preform having a void volume of 40% and a bulk density of 1.1 g/cc.

Example 2

An optically anisotropic petroleum pitch having a softening point of 280° C. was melt-spun to afford pitch fibers having an average diameter of 13 μm. A tow of 2,000 filaments of the pitch fibers was made infusible in air at 230° C. for 25 hours to obtain a tow of infusibilized fibers. This tow was then cut into 10 cm long, which were then charged into a die, followed by pressing at 25° C. and at a pressure of 50 kg/cm$^2$ for 3 minutes, using a press machine. The thus-pressed product was fixed using a graphite jig and carbonized in nitrogen gas at 700° C. for 1 hour to give a carbon preform having a void volume of 40% and a bulk density of 1.0 g/cc.

Example 3

An optically anisotropic petroleum pitch having a softening point of 280° C. was melt-spun to afford pitch fibers having an average diameter of 13 μm. A tow of 2,000 pieces of the pitch fibers was made infusible in air at 230° C. for 2 hours to obtain a tow of infusibilized fibers. This tow was then cut into strips 10 cm long, which were then charged into a die, followed by pressing at 25° C. and at a pressure of 50 kg/cm$^2$ for 1 minutes, using a press. The thus-pressed product was carbonized in nitrogen gas at 700° C. for 1 hour under uniaxial pressing at a pressure of 0.05 kg/cm$^2$ to give a carbon material having a void volume of 40% and a bulk density of 1.0 g/cc.

Example 4

An optically anisotropic petroleum pitch having a softening point of 280° C. was melt-spun to afford pitch fibers having an average diameter of 13 μm. A tow of 2,000 filaments of the pitch fibers was made infusible in air at 230° C. for 1.5 hours to obtain a tow of infusibilized fibers. This tow was then cut into strips 10 cm long, which were then charged into a die, followed by pressing at 25° C. and at a pressure of 50 kg/cm$^2$ for 2 minutes, using a press machine. The thus-pressed product was carbonized in nitrogen gas at 700° C. for 1 hour under uniaxial pressing at a pressure of 0.02 kg/cm$^2$ followed by heat treating in nitrogen at 2,000° C. and atmospheric pressure, to give a carbon preform having a void volume of 65 and a bulk density of 0.74 g/cc.

The carbon preform thus obtained was then densified by a chemical vapor deposition at 1,200° C., 1, 5 Torr, for 200 hours, using methane as a starting gas, to produce a carbon/carbon composite.

The void volume of the carbon/carbon material was less than 5%. An extremely uniform matrix distribution free of cracks was observed through a polarizing microscope or scanning electron microscope.

Comparative Example 1

An optically anisotropic petroleum pitch having a softening point of 280° C. was melt-spun to afford pitch fibers having an average diameter of 13 μm. A tow of 2,000 filaments of the pitch fibers was made infusible in air at 230° C. for 2 hours to obtain a tow of infusibilized fibers. This tow was then cut into strips 10 cm long which were then charged into a die, followed by uniaxial pressing art 350° C. and at a pressure of 50 kg/cm$^2$ for 2 minutes using a press machine. The thus-pressed product was carbonized in nitrogen gas at 700° C. for 1 hour under uniaxial pressing at a pressure of 70 kg/cm$^2$. As a result, cracking was observed in the pressed product.

Comparative Example 2

An optically anisotropic petroleum pitch having a softening point of 280 ° C. was melt-spun to afford pitch fibers having an average diameter of 13 μm. A tow of 2,000 filaments of the pitch fibers was made infusible in air at 230° C. for 1.5 hours to obtain a tow of infusibilized fibers. This tow was then cut into strips 10 cm long, which were then charged into a die, followed by uniaxial pressing at 25° C. and at a pressure of 50 kg/cm² for 2 minutes, using a press machine. The thus-pressed product was carbonized in nitrogen gas at 700° C. for 1 hour under uniaxial pressing at a pressure of 30 kg/cm². As a result, cracking was observed in the pressed product.

Comparative Example 3

An optically anisotropic petroleum pitch having a softening point of 280° C. was melt-spun to afford pitch fibers having an average diameter of 13 μm. A tow of 2,000 filaments of the pitch fibers was made infusible in air at 230° C. for 2 hours to obtain a tow of infusibilized fibers. This tow as then cut into strips 10 cm long, which were then charged into a die, followed by uniaxial pressing at 25° C. and at a pressure of 50 kg/cm² for 2 minutes, using a press machine. Ths thus-pressed product was carbonized in nitrogen gas at 700° C. for 1 hour under uniaxial pressing at a pressure of 70 kg/cm² and then allowed to stand for cooling. As a result, cracking was observed in the pressed product.

Comparative Example 4

An optically anisotropic petroleum pitch having a softening point of 280° C. was melt-spun to afford pitch fibers having an average diameter of 13 μm. A tow of 2,000 filaments of the pitch fibers was made infusible in air at 230° C. for 2 hours to obtain a tow of infusibilized fibers. This tow was then placed in a die continuously from an upper portion of the die and was deposited, then pressed at 300° C. and at a pressure of 50 kg/cm² for 2 minutes, using a press machine, and thereafter carbonized in nitrogen gas at 1,000° C. and at atmospheric pressure for 1 hour. As a result, cracking was observed in the pressed product.

Comparative Example 5

A tow of carbon fibers and a pitch were charged into a die and carbonized at 600° C. for 1 hour under uniaxial pressing at a pressure of 10 kg/cm² by means of a hot press to afford a carbon material having a void volume of 30% and a bulk density of 1.1 g/cc. The carbon material was then heat treated in nitrogen at 1,000° C. and at atmospheric pressure. As a result, cracking was observed centrally of the carbon material and it was no longer possible to densify the carbon material into a carbon/carbon composite.

What is claimed is:

1. A process for producing a carbon preform comprising subjecting a precursor fiber for a carbon fiber to an infusibilizing treatment; subjecting the thus infusibilized fiber to uniaxial pressing at a pressure of 1 to 100 kg/cm² and at a temperature of 20° C. to 350° C. which is lower than the temperature adopted in said infusibilizing treatment; and then subjecting the thus-pressed fiber to a carbonization treatment.

2. The process of claim 1 wherein the infusibilized fiber is fed, dropped or charged into a vessel and uniformly deposited therein prior to said uniaxial pressing step.

3. The process of claim 1, wherein the infusibilized fiber is obtained by making pitch fiber infusible.

4. The process of claim 2 wherein the carbonization treatment is conducted under uniaxial pressing and includes, before or after the carbonization treatment, a needle punch treatment conducted perpendicularly to the stacked plane of the fibers.

5. The process of claim 1, wherein the carbonization treatment is performed at atmospheric pressure or under isostatic pressure.

6. The process of claim 5 wherein said carbonization treatment occurs under uniaxial pressure, said uniaxial pressure being lower than the pressure of said uniaxial pressing step.

7. The process of claim 1, wherein the carbonization treatment is performed at a temperature of 400° C. to 3,000° C.

8. The process of claim 1, wherein the carbon preform has a void volume of 10 to 90 vol %.

9. The process of claim 1 wherein said infusibilized fiber is in the form of continuous filament fibers.

10. The process of claim 9 wherein said fiber are fed onto a pulley and forcibly uniformly charged into a vessel by means of an air ejector followed by uniaxial pressing.

11. The process of claim 9 wherein said fibers are fed into a position above a vessel and cut into short fibers 1 to 100 cm. long, said fibers freely dropping into said vessel.

12. The process of claim 1 wherein said infusibilized fiber is in the form of short fibers 1 to 100 cm. long which are dropped into a vessel and thereafter uniaxially pressed.

13. The process of claim 1 wherein said infusibilized fiber is fed, dropped or charged into a vessel by means of a fiber feeding apparatus.

14. The process of claim 1 wherein said infusibilized fiber is fed, dropped or charged into a movable vessel.

* * * * *